United States Patent Office 2,883,376
Patented Apr. 21, 1959

2,883,376

PROCESS OF MANUFACTURING NITROSTARCH

Ignace A. Grageroff, New York, N.Y., assignor to Vsevold A. Amoretty, New York, N.Y.

No Drawing. Application August 2, 1957
Serial No. 675,819

9 Claims. (Cl. 260—233.5)

My present invention relates to the manufacture of nitrostarch explosives.

Nitrostarch explosives have several advantages among which are its low cost and the plentiful supply of the raw material. For example, nitrostarch is more advantageous than TNT because TNT is not only more costly but also requires the use of toluene which is usually unavailable in sufficient quantities during times of war. On the other hand, nitrostarch as heretofore produced had poor stability and could not be safely handled or stored. See, for example, "The Chemistry of Powder and Explosives," by Tenney L. Davis, Ph.D., volume II, published 1943 by John Wiley & Sons, Inc., New York.

In accordance with my invention, it is now possible to produce nitrostarch which possesses a high degree of stability and can be safely handled and stored for long periods of time, and these results can be accomplished under practical and economical manufacturing conditions and by the use of known apparatus and raw materials readily available in ample supply.

I attribute the instability of the nitrostarch as heretofore produced to the fact that the starch employed as the raw material was not completely dissolved before being nitrated or during nitration by the mixed, sulphuric and nitric acids, with the result that the reaction was incomplete. This is due to the fact that a corn starch granule is not homogeneous; it consists of at least two chemical compounds of different degrees of solubility, namely an outer envelope and an inner substance, the envelope being less soluble than the inner substance and therefore interfered with or prevented complete contact of the mixed acid with all of the starch granule and hence prevented the completion of the reaction of the mixed acid with all of the starch granule in the nitration process. This difficulty is obviated by my invention; more particularly by completely dissolving the starch granule before the starch is subjected to the action of the mixed acid in the nitration process and by avoiding nitration of the starch while it is dissolving and hence incapable of being sufficiently nitrated to possess sufficient stability.

Briefly described, my process of producing nitrostarch comprises the treatment of cornstarch powder with weak nitric acid, as a result of which the cornstarch is completely dissolved without nitration, and only after this solution is obtained is the nitration process performed. The principle on which my process is based may be considered, for purposes of explanation, as the opposite of the theory of nitration which is that the higher the partial vapor tension of nitric acid is the better is the nitration with the mixed sulphuric and nitric acids. Thus, in accordance with my invention, the partial vapor tension of the nitric acid in the aqueous solution of nitric acid employed for dissolving the starch is very low or even non-existent. For example, the preferred solution of $HNO_3$ employed for dissolving the starch is a 55% $HNO_3$ solution in water and this partial vapor tension of the $HNO_3$ is only a small fraction of 1 mm. at $-5°$ C., according to known data, for example, in Chemical Engineer's Handbook, 1950 edition, page 70, published by McGraw-Hill Book Company. The nitric acid solution is maintained at about the indicated temperature of $-5°$ C., by suitably cooling the contents of the vessel in which the starch is dissolved. This temperature is preferred because it is sufficiently low to prevent decomposition of the starch and yet sufficiently high to provide a sufficiently high concentration of the starch solution for practical and economic production yield of nitrostarch when the nitration operation is performed.

The following is a more detailed description of the process performed in accordance with my invention:

A sufficient quantity of cornstarch in dry powder form is added to a 55% nitric acid solution in water to obtain a saturated solution of starch in the solution of acid. This operation is performed while maintaining the temperature of the solution at $-5°$ C. This saturated solution may be formed in a conventional tank or pot called a nitrator, which is a tank lined with an acid proof metal, such as lead, for example, and provided with a mechanical stirrer or agitator which is kept in motion throughout the process. The tank is also cooled in an appropriate way by a cooling coil of any suitable type. After the saturated solution is obtained, the nitration process is performed as heretofore, that is by adding a mixture of strong sulphuric and nitric acids (called mixed acid), the usual proportions being 79.91% of sulphuric acid and 19.73% of nitric acid, along with .32% of nitrous oxide, ($NO_2$) and .04% of $H_2O$, (proportions by weight). The nitrating operation to produce nitrostarch is performed in the same tank as that in which the solution of the starch in the diluted $HNO_3$ in $H_2O$ was performed. The mixed acid is added in small quantities at a time to maintain the temperature at about $-5°$ C. As soon as all of the starch is converted into nitrostarch by adding the required quantity of mixed acid, the next step is to separate the nitrostarch from the spent acid by filtration and this operation is accomplished in the customary way. After the separation of the nitrostarch from the spent acid, the latter is transmitted to the recovery plant for recovery of the acids.

The filtered nitrostarch is then washed with water containing 1% of $NH_4OH$ and ground to a fine consistency, i.e., to break up lumps and obtain a smooth mass of the nitrostarch in the liquid. Then the material is washed with water at a temperature of 70° C. to eliminate the ammonia. Then the material is dried at a temperature of about 70° C. The material is then subjected to an Abel heat test in accordance with the required standard for stability. If the material does not satisfy the required test, it is then rewashed with water. In the given example, the heat test was 45 minutes.

The following is an example which is given by way of illustration and not by way of strict limitation.

10.72 grams of dry cornstarch powder are added to 224 grams of the above indicated $HNO_3$-water solution, under agitation, which is continued, and the temperature of the solution maintained at $-5°$ C. This produces a saturated solution of starch. Then 556 grams of the mixed acid are added in small quantities while cooling was continued and maintained at $-5°$ C. In other words, the mixed acid is added slowly and while being added, the thermometer is carefully observed so as to prevent an increase of temperature beyond $-5°$ C.

Although cornstarch is preferred as the raw material, this process can be used with any other starch heretofore employed in the manufacture of nitrostarch explosives. Also, while the acid solution of the specified concentration and the specified temperature at which the process is performed are preferred, deviations therefrom which do not constitute a departure from the above indicated basic principle of my invention may be unobjectionable, as will be clear to persons skilled in the art in view of the above description. Accordingly, I do not wish to be limited precisely to the process described in detail herein, except to the extent required by the appended claims considered with reference to the prior art.

Having thus described my invention, what I claim and desire to secure by Letters Patent, is:

1. The method of making a nitrostarch explosive, comprising first forming a saturated solution of starch in a weak nitric acid incapable of nitrating the starch and thereafter nitrating the dissolved starch by adding to said solution a mixed acid comprising a mixture of sulphuric acid and nitric acid, the proportions by weight of sulphuric acid to nitric acid being essentially 4:1.

2. The method of making a nitrostarch explosive, comprising first forming a solution of starch in a weak nitric acid incapable of nitrating the starch, said weak nitric acid consisting essentially of a 55% $HNO_3$ solution in water and said solution maintained at a temperature of about $-5°$ C., and thereafter adding to said solution a mixed acid for nitrating the starch dissolved in said weakened acid, said mixed acid comprising a mixture of sulphuric acid and nitric acid.

3. The method of making a nitrostarch explosive, comprising first forming a saturated solution of starch in a weak nitric acid by introducing dry cornstarch powder into a tank containing a weak nitric acid for dissolving the starch without nitration thereof, and thereafter introducing into said tank a mixed acid for nitrating the starch in said solution, said mixed acid comprising a mixture of sulphuric acid and nitric acid.

4. The method of making a nitrostarch explosive, comprising first forming a solution of starch in a weak acid by introducing dry cornstarch powder into a tank containing a weak acid for dissolving the starch without nitration thereof, said weak acid consisting essentially of a 55% $HNO_3$ solution in water and said solution maintained at a temperature of about $-5°$ C., and thereafter adding to said solution a mixed acid for nitrating the starch dissolved in said weakened acid, said mixed acid comprising a mixture of sulphuric acid and nitric acid.

5. The method of making a nitrostarch explosive, comprising first forming a saturated solution of starch in a weak acid incapable of nitrating the starch, said weak acid consisting essentially of a 55% $HNO_3$ solution in water and said solution maintained at a temperature of about $-5°$ C., and thereafter adding to said solution a mixed acid for nitrating the starch dissolved in said weakened acid, said mixed acid comprising a mixture of sulphuric acid and nitric acid.

6. The method of making a nitrostarch explosive, comprising first forming a saturated solution of starch in a weak nitric acid by introducing dry cornstarch powder into a tank containing a weak nitric acid for dissolving the starch without nitration thereof, and thereafter introducing into said tank a mixed acid for nitrating the starch in said solution, said mixed acid comprising a mixture of sulphuric acid and nitric acid.

7. The method of making a nitrostarch explosive, comprising first forming a solution of starch in a weak acid by introducing dry cornstarch powder into a tank containing a weak acid for dissolving the starch without nitration thereof, said weak acid consisting essentially of a 55% $HNO_3$ solution in water and said solution maintained at a temperature of about $-5°$ C., and thereafter adding to said solution a mixed acid for nitrating the starch dissolved in said weakened acid, said mixed acid comprising a mixture of sulphuric acid and nitric acid.

8. The method of making a nitrostarch explosive, comprising first forming a saturated solution of starch in a weak nitric acid incapable of nitrating the starch and thereafter nitrating the dissolved starch by adding to said solution a mixed acid comprising a mixture of sulphuric acid and nitric acid.

9. The method of making a nitrostarch explosive, comprising first forming a saturated solution of starch in a weak acid incapable of nitrating the starch, said weak acid consisting essentially of a 55% $HNO_3$ solution in water and said solution maintained at a temperature of about $-5°$ C., and thereafter adding to said solution a mixed acid for nitrating the starch dissolved in said weakened acid, said mixed acid comprising a mixture of sulphuric acid and nitric acid, the proportions by weight of sulphuric acid to nitric acid being essentially 4:1.

References Cited in the file of this patent

UNITED STATES PATENTS

| 2,112,989 | Helle et al. | Apr. 5, 1938 |
| 2,678,310 | Brooks | May 11, 1954 |

FOREIGN PATENTS

| 14,625 of 1890 | Great Britain | Oct. 18, 1890 |